United States Patent [19]

Wiley, Jr.

[11] 3,822,910

[45] July 9, 1974

[54] UNIVERSAL WIND DEFLECTOR SUPPORT SYSTEM

[75] Inventor: Nathaniel C. Wiley, Jr., Weston, Conn.

[73] Assignee: Rudkin-Wiley Corporation, Stratford, Conn.

[22] Filed: June 28, 1973

[21] Appl. No.: 374,776

[52] U.S. Cl. ............................................. 296/1 S
[51] Int. Cl. ............................................. B60j 1/04
[58] Field of Search ....... 296/1 S, 1 R, 95; 280/403; 105/2

[56] References Cited
UNITED STATES PATENTS 2,863,695    12/1958    Stamm .............................. 296/1 S Primary Examiner—Stanley H. Tollberg
Attorney, Agent, or Firm—Mattern, Ware and Davis

[57] ABSTRACT

A wind deflector support system universally applicable for mounting to the roof of all different types of tractors and cabs is provided by employing a support system comprising a deflector bracket, a support column, a cab bracket, and an arcuately adjustable channel iron member. By providing a channel iron member having one end that incorporates a pivotable hemispherically articulating joint with the other end attachable to a rotatable bracket, a universal wind deflector support system is provided which is capable of being mounted to any type of cab configuration presently on the market, along with any type of cab configuration in the forseeable future.

7 Claims, 7 Drawing Figures

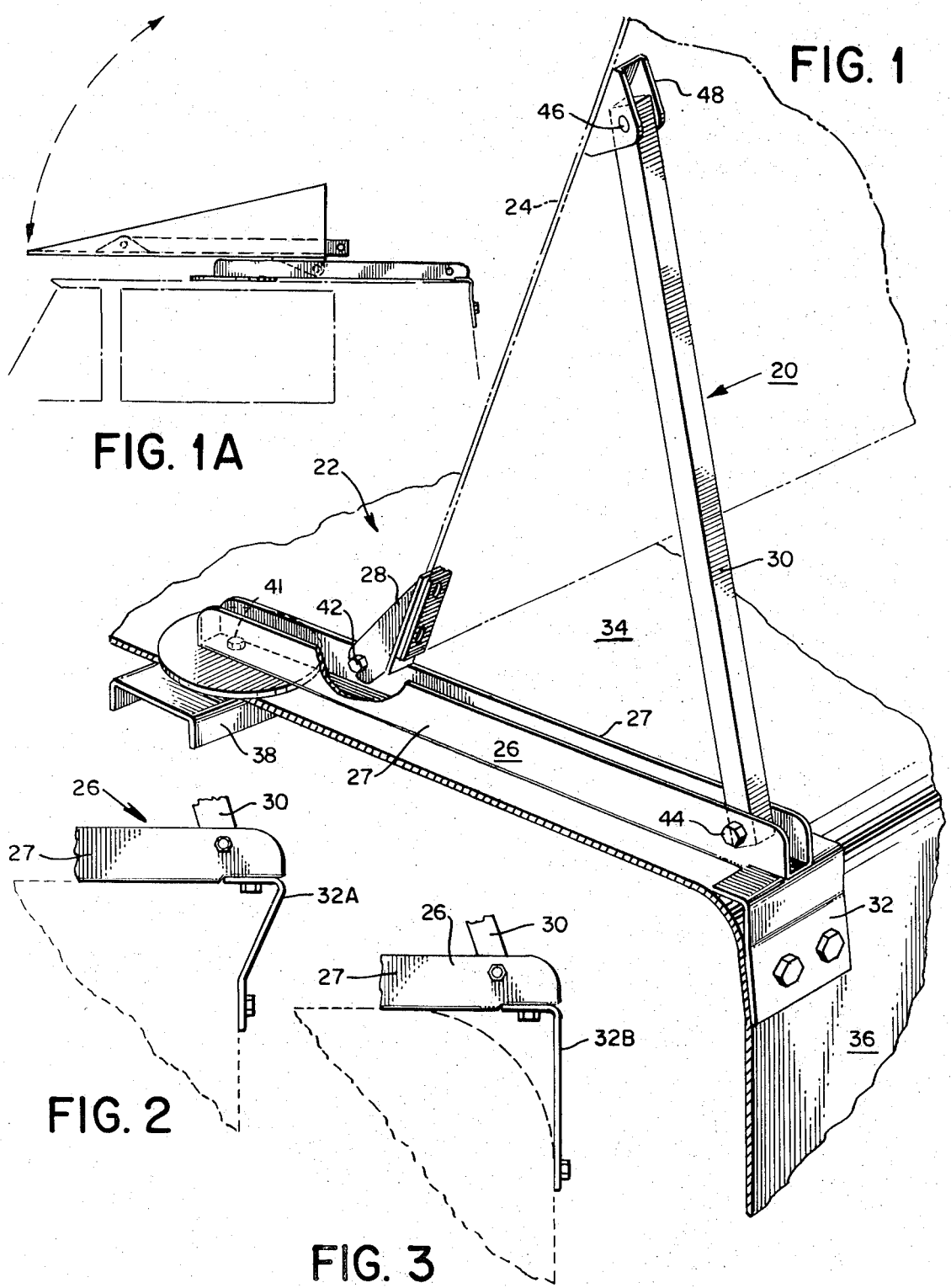

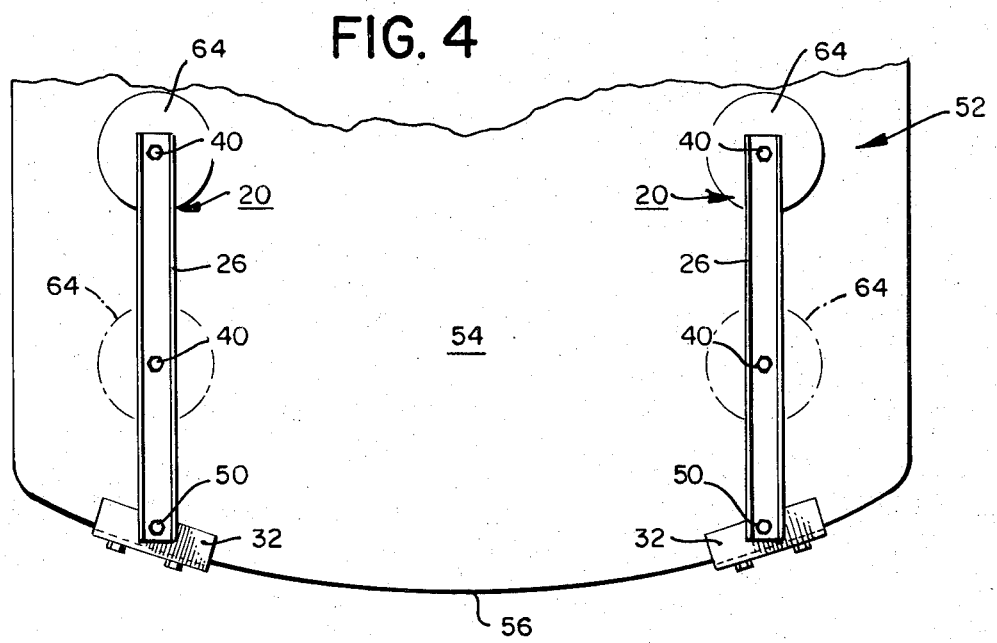
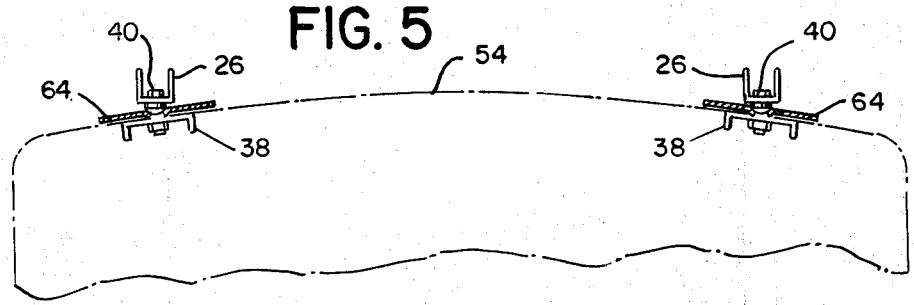
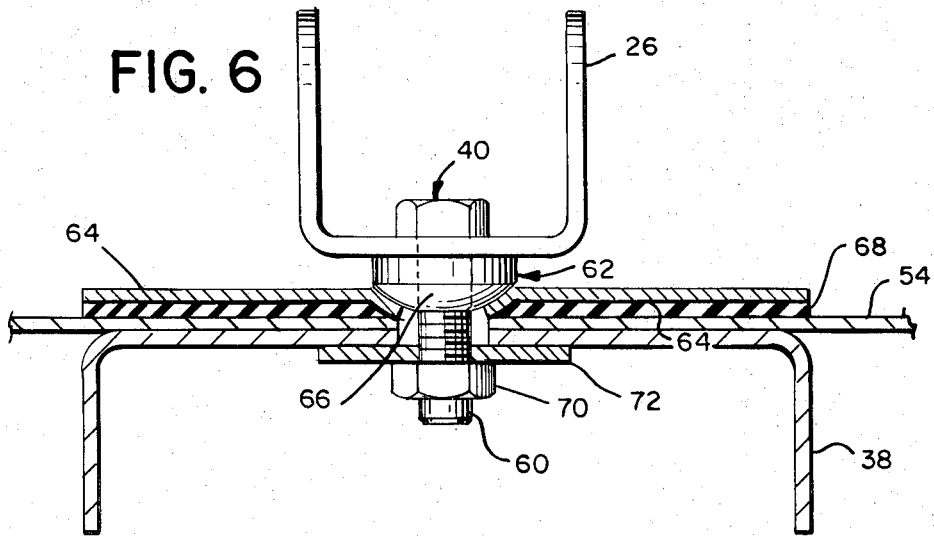

UNIVERSAL WIND DEFLECTOR SUPPORT SYSTEM

BACKGROUND OF THE INVENTION

This invention relates to universal wind deflector support systems, and more particularly to universal wind deflector support systems for use on tractor and cab roofs.

It has been discovered that land vehicles, especially tractor trailers and single chassis trucks, can obtain improved performance by having wind deflectors mounted on the roof of the cab. Such wind deflectors are well known in the art, and are fully disclosed in Walter S. Saunders' U.S. Pat., Nos. 3,241,876; 3,309,131; and 3,348,873.

In order to mount these wind deflectors in the optimum position and location, a support system must be provided which will effectively secure the base of the wind deflector to the cab roof and also securely hold the wind deflector at or near its top. Furthermore, the support system must be capable of quick disassembly to allow the wind deflector to be pivoted into a substantially horizontal "fold-down" position, in order to allow the truck to pass under areas having a low clearance.

Prior art wind deflector support systems have severe problems. Due to the many different types of tractor cab roof configurations that exist, each cab roof configuration essentially has to have an individually sized wind deflector support system for it. This requires a large inventory, with smaller production quantities, all of which results in higher prices. Furthermore, as new cabs with new designs are manufactured, a new wind deflector support system has to be developed.

Another problem that exists with prior art support systems is their unknown performance characteristics. Since each cab roof design requires an individually created, support system, complete performance testing is not feasible. Consequently, any particular design may result in extremely annoying "drumming" on the roof of the cab due to an imperfect fit. In some situations, an imperfect design can produce stresses on the cab roof that may result in actually tearing the metal of the roof.

Furthermore, since the forces acting on the wind deflector are very high, it is extremely important that the wind deflector support system is inherently structurally sound, as well as being carefully installed and fitted to the vehicle. Some prior art support systems incorporate welded pieces as part of the support system. In some instances, the forces generated have caused these welded pieces to come apart, resulting in complete failure of the support system.

OBJECTS OF THE INVENTION

It is an object of this invention to provide a wind deflector support system that can be used on any type of cab configuration on the market at the present time, and any cab configuration in the forseeable future.

Another object of this invention is to provide a wind deflector support system of the above character that is structurally sound both inherently and when installed on any cab roof.

Another object of this invention is to provide a wind deflector support system of the above character that will not result in drumming on the cab roof.

A further object of this invention is to provide the wind deflector support system of the above character that can be quickly and easily mounted to a cab roof and when in place will not result in tearing of the metal of a cab roof.

Other and more specific objects will in part be obvious and will in part appear hereinafter.

SUMMARY OF THE INVENTION

The universal wind deflector support system of this invention basically comprises four parts — a deflector bracket, a support column, a cab bracket, and an arcuately adjustable channel iron member. The principal part of this universal support system is the arcuately adjustable channel iron member. This channel iron member is bolted at one end to the cab roof at a convenient structurally supported location on the cab roof, and extends therefrom to the rear of the cab roof where the channel iron member is bolted to the cab bracket. The use of a single support member which is bolted directly to the roof at one end, such as the channel iron member, is extremely important, since its use eliminates the prior art requirement for welded pieces. Consequently, a more structurally sound support system is provided.

The major difficulty encountered in providing a universal wind deflector support system is found in the many different configurations that are employed by various manufacturers for their particular cab. The manufacturers not only use different shapes and slopes of the rear wall of the cab, but also produce roof configurations that are either flat or curved, with inclined straight or curved surfaces in any direction. Therefore, in order to provide a universal wind deflector support system that can be directly attached to the cab roof with the channel iron member having its sides substantially normal to the road, it is necessary that the channel iron member be arcuately adjustable to accommodate the curvature of any particular cab roof. It is important to maintain the sides of the channel iron member substantially normal to the road in order to assure the proper operation of the support system, especially during "fold down" of the wind deflector.

In the universal wind deflector support system of this invention, at least one end of the channel iron member incorporates a pivotable, hemispherically articulating joint. As a result of this construction, the channel iron member can be installed on either flat or curved roofs while still maintaining the sides of the channel iron member substantially normal to the road. At the rear end of the channel iron member, a cab bracket is rotatably secured to the channel iron member at one of the bracket's ends, with the other end of the bracket secured to the rear wall of the cab. Since this cab bracket is rotatably connected to the channel iron member, this bracket is capable of being secured to either flat or curved cab walls. Furthermore, since the rear walls of the cab may have varied configurations, a standard bracket can be bent to accommodate the particular cab configuration to which attachment is desired.

The remaining parts of the universal wind deflector support system are the deflector bracket and the deflector support column. The base of the deflector support column is pivotably bolted to the channel iron member at the rear thereof, near the cab bracket, and extends upwardly with its opposite end secured to the desired position on the wind deflector itself. The deflector bracket has one portion secured near the base of the wind deflector, and another portion is pivotally secured to the channel iron member at a position forward of the support column's connection to the channel iron member. The particular location of the connection point for the deflector bracket and the support column on the channel iron member is determined by the particular slope of the wind deflector desired.

In the preferred embodiment, two sets of the universal support system are employed in order to provide the stability and rigidity required to assure proper, trouble-free operation of the wind deflector.

The invention accordingly comprises a product possessing the features, properties, and relation of components which will be exemplified in the product hereinafter described, and the scope of the invention will be indicated in the claims.

THE DRAWINGS

For a fuller understanding of the nature and objects of the invention, reference should be had to the following detailed description, taken in connection with the accompanying drawings, in which:

FIG. 1 is a perspective view, partially in cross section, showing the universal wind deflector support system of this invention mounted on the roof of a cab with a wind deflector shown in phantom;

FIGS. 2 and 3 are side elevation views of the rear portion of the wind deflector support system of this invention, showing the adaption of this universal system to different cab rear wall configurations;

FIG. 4 is a top plan view of part of the universal wind deflector support system of this invention mounted on a cab having a convex rear wall;

FIG. 5 is a front elevation view of part of the universal wind deflector support system of this invention, showing the support system mounted on a cab having a convex roof;

FIG. 6 is a greatly enlarged front elevation view of the preferred embodiment of the arcuately adjustable channel iron member of the support system of this invention; and FIG. 1A is a side elevation view of the universal wind deflector support system of this invention in the folded down position, with a wind deflector shown in phantom.

The same reference numbers refer to the same elements throughout the several views of the drawings.

DETAILED DESCRIPTION

In FIG. 1, the universal wind deflector support system 20 is shown mounted in place on cab roof 22, securely supporting wind deflector 24, shown in phantom. Universal support system 20 comprises a structural supporting, arcuately adjustable channel iron member 26, a wind deflector bracket 28, a support column 30, and a cab bracket 32. The cab 22 comprises a cab roof 34 and a rear wall 36.

The channel iron member 26 comprises parallel extending sides 27 and preferably extends from a position towards the front of cab roof 34 to the rear of cab roof 34, where the roof intersects with rear wall 36. Preferably, channel iron member 26 extends in a direction substantially parallel to the sides of the cab. The forward end of channel iron member 26 is bolted directly to cab roof 34. Preferably, channel iron member 26 is bolted to a structural member of cab 22, such as the transverse extending structural member 38, shown in FIG. 1. If no structural member of the cab roof is available, channel iron member 26 can be bolted directly to cab roof 34 by drilling holes in cab roof 34 and incorporating stress carrying reinforcement members well known in the art. As is more fully disclosed below, the forward bolt 41 may be arcuately adjustable; although with flat roof 34, the arcuate adjustability is not required, and a simple bolt 41 can be used. If desired, a flat thick washer may be positioned between the channel iron member and the roof.

The rear end of channel iron member 26 is bolted directly to cab bracket 32, and cab bracket 32 is bolted directly to the rear wall 36 of cab 22. Wind deflector 24 is securely held in the desired position by support column 30 and deflector bracket 28. Deflector bracket 28 is securely attached to wind deflector 24 near its base, and is pivotally secured to side 27 of channel iron member 26 by means of bolt 42.

Supporting column 30 is pivotably bolted at one end to sides 27 of channel iron member 26 by means of bolt 44 and, at its other end, support column 30 is secured to wind deflector 24 by means of bolt 46. In the preferred embodiment, as shown in FIG. 1, wind deflector 24 incorporates a holding bracket 48, and column 30 is bolted to bracket 48.

In operation, it is important that wind deflector 24 be easily disconnected from the support system 20, in order to allow deflector 24 to be pivoted into a substantially horizontal, "fold-down" position, substantially parallel with roof 34 of cab 22, as shown in FIG. 1A. This flexibility is required in order to allow the tractor-trailer or single chassis truck to get into and out of low clearance areas. In order to accomplish the pivotable fold-down of wind deflector 24, bolt 44 is disconnected and wind deflector 24, along with support column 30, is pivoted forward until the desired, substantially horizontal position is obtained. In the preferred embodiment, bolt 44 comprises a quick disconnect expansion bolt, in order to facilitate its quick removal. If desired, hold-down means, such as a tether rope, can be attached to the edge of the wind deflector and a convenient position on the cab in order to prevent unwanted movement of the folded-down wind deflector, especially when the cab is being driven separately.

The only part of the universal wind deflector support system which requires some individual modification is the cab bracket 32. However, a universal blanking die is employed for all of the various configurations for the cab bracket 32 and, when an order for a specific type of cab bracket is placed, the universally stamped part is adjusted to the required configuration. In FIGS. 2 and 3, two typical roof configurations are shown in phantom, with the particular shaped cab bracket shown mounted thereon.

In FIG. 2, cab bracket 32A must be bent in order to accommodate the shape of the rear wall of the cab while still providing room for bolting to the channel iron member. In FIG. 3, cab bracket 32B need not be adjusted, and instead can use the universally stamped bracket.

In the preferred embodiment, two sets of universal support systems 20 are mounted to the cab roof, substantially as shown in FIGS. 4 and 5. For purposes of discussion, support column 30 and wind deflector bracket 28 of support system 20 are not shown.

In FIGS. 4 and 5, the universal flexibility of support system 20 is made more apparent by showing support system 20 mounted to a cab 52, having a substantially convex roof 54 and a convex rear wall 56.

As shown in FIG. 4, channel iron member 26 is preferably bolted to cab roof 54 by bolt assembly 40 near one end and substantially in the middle of channel iron member 26. Although it is preferred to have channel iron member bolted to the cab roof in two places for added stability, a single bolt connection is satisfactory.

The other end of channel iron member 26 is bolted to cab bracket 32 by means of a single bolt 50. This single bolt connection allows cab bracket 32 to be rotatable about the axis defined by bolt 50. Due to this rotatable quality, cab bracket 32 can be easily mounted to convexly curved rear wall 56 of cab 52, as well as any other shaped rear wall known in the art or forseeable in the future. If desired, bracket 32 can be bolted to channel iron member 26 by arcuately pivotable means, such as bolt assembly 40.

As shown in FIG. 5, bolt assembly 40 of channel iron member 26 comprises an arcuately adjustable arrangement in order to allow channel iron member 26 to be mounted to a contoured roof, such as convexly-shaped roof 54 of cab 52, while still maintaining sides 27 of channel iron member 26 substantially normal to the road. This arrangement of channel iron member 26 is important in order to provide a wind deflector support system that can be used on both sides of a single cab roof, regardless of its shape, while still maintaining the required wind deflector disconnect and "fold down" feature. Furthermore, this arrangement minimizes the stresses produced on any single component part, assuring substantially trouble-free operation.

In FIG. 6, the preferred embodiment of arcuately adjustable bolt assembly 40 can best be seen. Bolt assembly 40 comprises a bolt member 60, a nut member 62, a reinforcing plate 64, a gasket 68, a nut member 70, and a washer member 72. Bolt member 60 passes through channel iron member 26, and is secured in this position by nut member 62. Nut member 62 comprises a surface 66 which is substantially hemispherical in shape. Reinforcing plate 64 cooperatingly abuts hemispherical surface 66 of nut member 62. This construction allows reinforcing plate 64 to pivot about hemispherical surface 66 through an arcuate distance of approximately 25 degrees, about a point lying on the axis of bolt 60. As a result, reinforcement plate 64 can be positioned directly in contact with the cab roof of substantially any vehicle, regardless of the shape of the roof, while the central axis of bolt 60 will remain substantially normal to the road, with sides 27 of channel iron member 26 substantially parallel to the axis of bolt 60.

Gasket 68 is positioned between reinforcing plate 64 and cab roof 54. The entire assembly is secured to cab roof 54 by means of washer member 72 and nut member 70, which are mounted on bolt 60 and then secured on the underside of cab roof 54 beneath structural member 38. In the preferred embodiment, gasket 68 is formed in such a manner as to allow metal to metal contact between the outer surface of that portion of plate 64 which cooperates with hemispherical surface 66 of nut 62 and the cab roof 54.

Although this is the preferred embodiment for bolt assembly 40 and channel iron member 26, it is possible to incorporate a channel iron member which is substantially rounded at its base, capable of having holes drilled through it for securement to a cab roof at different locations on this curved surface, in order to maintain the sides of the channel member substantially normal to the road. Such a construction is a satisfactory equivalent for cabs which have a side-to-side curved roof. It is important to stress that the use of structural support member 26, which is capable of being directly bolted to the roof of a cab, eliminates previous requirements for welded parts and aids greatly in providing a wind deflector support system that is inherently structurally sound and capable of withstanding substantially large forces when in use.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of this invention herein described, and all statements of the scope of the invention which, as a matter of language, might be said to fall therebetween.

Having described my invention, what I claim as new and desire to secure by Letters Patent is:

1. A wind deflector support system for mounting to land transport vehicles, comprising:
   A. an elongated structural support member for bolting to a roof of said land transport vehicle;
   B. a deflector bracket mounted to said wind deflector and pivotably secured to said support member along its length;
   C. a support column, attached to said wind deflector and pivotably secured to said support member near one end thereof; and
   D. a bracket, pivotably mounted to said support member near one end thereof and adapted for bolting to said motor vehicle.

2. The apparatus defined in claim 1, wherein said elongated structural support member comprises a pivot-inducing bolt assembly incorporating
   a. a bolt for securing said support member to the roof of said land transport vehicle,
   b. a nut assembly threadedly engaged on said bolt disposed between said support member and the roof of said motor vehicle with one face thereof comprising a convexly curved shape, and
   c. a reinforcing plate adapted for cooperation with said convexly curved surface for angular pivoting on said curved surface about a point on the axis of said bolt, whereby said reinforcing plate can be pivoted to accommodate mounting to any type of vehicle roof configuration while the axis of said bolt is substantially normal to the ground.

3. The apparatus defined in claim 1, wherein said bracket is secured to said elongated structural support member by a single bolt means and is capable of pivoting about the axis defined by said bolt means.

4. The apparatus defined in claim 1, wherein said bracket is bolted to a rear wall of said land transport vehicle.

5. The apparatus defined in claim 1, wherein said wind deflector is capable of being pivoted from an upright position to a fold-down position by removal of one of said support column attachment means.

6. The apparatus defined in claim 1, wherein two of said support systems are secured to said land transport vehicle in a substantially parallel arrangement, extending substantially parallel to the saids of said motor vehicle.

7. The apparatus defined in claim 6, wherein each of said support systems is secured near the side edge of said wind deflector.

* * * * *

UNITED STATES PATENT OFFICE
CERTIFICATE OF CORRECTION

Patent No. 3,822,910          Dated August 7, 1974

Inventor(s) Nathaniel C. Wiley, Jr.

It is certified that error appears in the above-identified patent and that said Letters Patent are hereby corrected as shown below:

Column 8, line 1, Claim 6, "saids" should be -- sides --

Signed and sealed this 29th day of October 1974.

(SEAL)
Attest:

McCOY M. GIBSON JR.          C. MARSHALL DANN
Attesting Officer            Commissioner of Patents